United States Patent [19]

Boothman et al.

[11] 3,866,094

[45] Feb. 11, 1975

[54] INHIBITED POWER SUPPLIES

[75] Inventors: David Richard Boothman, Ennismore; David Walter Nutt, Peterborough, Ontario, both of Canada

[73] Assignee: Canadian General Electric Company Limited, Toronto, Ontario, Canada

[22] Filed: May 21, 1973

[21] Appl. No.: 362,048

[30] Foreign Application Priority Data
Oct. 26, 1972 Canada .............................. 155043

[52] U.S. Cl. .............................. 317/31, 317/33 VR
[51] Int. Cl. ............................................ H02h 3/24
[58] Field of Search ............... 317/31, 33 R, 33 VR; 317/33 VR

[56] References Cited
UNITED STATES PATENTS

| | | |
|---|---|---|
| 3,590,325 | 6/1971 | McMillen et al. .................... 317/31 |
| 3,740,738 | 6/1973 | Kosanovich et al. ............. 317/31 X |
| 3,754,182 | 8/1973 | Morris et al. ..................... 317/31 X |

Primary Examiner—Gerald Goldberg
Attorney, Agent, or Firm—James H. Beusse; Harold H. Green, Jr.

[57] ABSTRACT

An AC to DC power supply is provided for supplying DC to switch voltage level detector which is used with a fault detecting circuit as the control signal source when faults are detected. The DC side of the power supply includes means for inhibiting operation of the level detector during interruptions of the AC source, even though momentarily, and thereby stop the level detector from giving spurious control signals due to the interruptions. The inhibit means consists of an electronic switch in the power supply to the level detector and a switch control circuit consisting of voltage regulating means in combination with capacitance. At normal AC voltages, the switch control keeps the switched turned "on" and during interruption it makes the switch turn "off."

6 Claims, 4 Drawing Figures

POSITIVE POWER SUPPLY WITH INHIBIT

NEGATIVE POWER SUPPLY WITH COMMON RETURN

NEGATIVE POWER SUPPLY WITH INHIBIT

INHIBITED POWER SUPPLIES

BACKGROUND OF THE INVENTION

This invention relates to circuits for inhibiting spurious control signals from control circuits due to intermittent interruptions in the power supply for the control circuit.

Solid state devices are now used in control circuits for electrical apparatus such as electric motors. The applicants' copending Canadian application, Ser. No. 153,623 filed Oct. 11, 1972 and corresponding U.S. application, Ser. No. 362,047 filed May 21, 1973 describes and claims a circuit for protecting large motors from excessive heating due to overloads and stalled rotor. In this circuit, a signal which is a function of the motor current is compared with a known reference and a predetermined deviation therefrom is the source of the circuit breaker trip signal. The trip signal, will of course, cause the breaker to shut down the motor should the motor be stalled or overloaded too long. This type of signal comparing means is generally known as a level detector.

A level detecting trip circuit usually operates by comparing a varying voltage level with a fixed voltage level. The varying voltage level is often an analog signal of some physical condition such as temperature, current, voltage, speed, etc., and the fixed voltage level is usually obtained from an auxiliary power supply and set at some level equal to the desired maximum allowable value of the varying level. Thus, if the varying level exceeds the fixed level, the detector circuit gives an output signal which may be modified or applied directly to initiate a control function. In the aforementioned reference, the output signal is used as a trip signal for tripping the circuit breaker.

The fixed voltage level is usually obtained from across a bus and a common conductor energized by a DC constant voltage power supply, and the desired level is obtained by the adjustment of a voltage divider connected between the bus and common. Because the power supply is usually a static AC to DC rectifier, intermittent interruptions of the AC supply are reflected in the DC voltage on the bus. A rise of the bus voltage causes a wider margin to be transiently presented between the varying and fixed levels. A fall of the bus voltage causes the margin to be reduced, possibly to the extent that the fixed level falls below the varying level. The trip circuit cannot discriminate between the normal condition and the abnormal condition; it can only distinguish between levels, i.e., that one level is greater than the other. Hence a false trip signal is generated.

A solution proposed is to add capacitance to the fixed voltage level so that the effect of a fall in voltage is delayed, the larger the capacitance the longer the delay. This solution is unsatisfactory for a number of reasons, as for example:

1. If there is only a very minute difference between the two levels, huge capacitors will be required because the dv/dt at the fixed level is a function of the size of the capacitor. The dv/dt may be made very small but it will never be zero.
2. If a delay is applied to the fixed level, it will also be effective during the initial application of the power to the detector circuit. Hence the voltage will be slow to rise and stabilize at the fixed level. This may well lead to false tripping.

Circuits are available to prevent false tripping, the function of which is to sense transient conditions and direct the tripping circuit to hold off its tripping signal until the transient is over. Problems arise in these circuits with coordination because the transient sensing circuit must operate faster than the tripping circuit. These circuits tend to be rather complex, require considerable hardware, and are too costly for many applications. There is, therefore, a need for a simple low cost circuit for inhibiting spurious tripping of level detecting circuits due to intermittent interruptions of the power supply, and the object of this invention is to provide such a circuit.

According to the invention an AC to DC power supply is provided for supplying DC to a voltage level detector which is used with a fault detecting circuit as the control signal source when faults are detected. The DC side of the power supply includes means for inhibiting operation of the level detector during interruptions of the AC source, even though momentarily, and thereby stop the level detector from giving spurious control signals due to the interruptions. The inhibit means consists of an electroic switch in the power supply to the level detector and a switch control circuit consisting of voltage regulating means in combination with capacitance. At normal AC voltages, the switch control circuit keeps the switch turned "on" and during interruptions it makes the switch turn "off".

The invention will now be described in more detail with reference to the accompanying drawings, in which FIG. 1 is a circuit diagram of one embodiment of the inhibited power supply as used with a fault detecting circuit; and FIGS. 2, 3 and 4 are circuit diagram of other embodiment of the inhibited power supply.

DESCRIPTION OF THE PREFERRED EMBODIMENT

Figure 1:
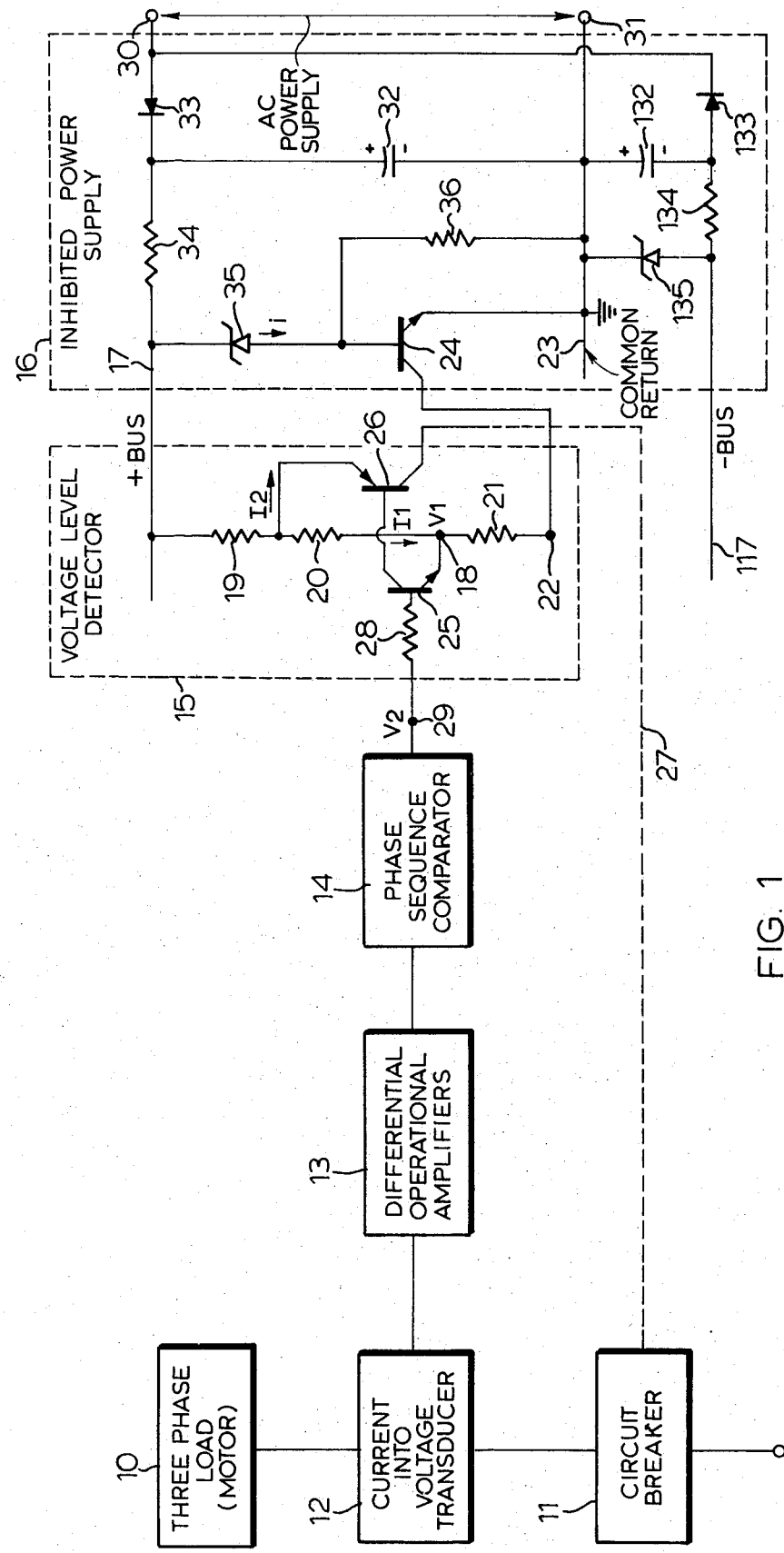

FIG. 1 is a block diagram of one of a number of control circuits using a voltage level detector for detecting an abnormal or fault condition in a three phase AC load. In this circuit a load 10 such as a motor is connected to a three phase AC supply through a circuit breaker 11. A current into voltage transducer 12 in the line between the breaker and the load senses the magnitude of the current to the load and gives a three phase sinusoidal voltage output which is a function of the load current. The transducer output voltage is fed into differential operational amplifier circuits 13 which converts it into a three phase square waveform signal. This signal is then fed to a phase sequence comparator 14 where the three square waveforms are compared for phase sequence. Should the sequence be disturbed due to a break in one or more of the leads to load 10 or an interchange of leads, a significant increase occurs in the voltage V2 put outr by the comparator. Level detector 15 senses this increase and in response theeto sends a signal to breaker 11 telling the bteaker to open its contacts and thereby disconnect the load from the supply. The iruit comprised of components 10 to 15 is described in more detail in the applicants' copending Canadian application, Ser. No. 153,623 filed Oct. 11, 1972 and corresponding U.S. application, Ser. No. 362,047 filed May 21, 1973.

Many solid state electronic circuits used with protective equipment for loads such as motors produce changes in voltages when abnormalities such as overloads, incorrect phase sequence, etc., occur in the phase supply to the load. These changes in voltage from the basis for control signals, and a convenient way to obtain signals suitable for control purposes is to compare the changes with a known reference in a circuit generally known as a voltage level detector. A voltage level detector is essentially a solid state circuit which produces an output sinal suitable for control purposes upon the voltage change attaining a specified level.

A voltage level detector suitable for use at 15 in FIG. 1 will now be described. In this circuit V2 is the monitored voltage at terminal 29 ut out by comparator 14, and the voltage on bus 17 is a relatively constant positive reference voltage provided by the power supply 16. Point 18 is therefore at a fixed voltage V1 due to the current I1 flowing down through resistors 19, 20 and 21 to point 22, which point is connected to the common return 23 via the collector-emitter of the transistor 24 in the power supply. When the power supply is operating normally without interruptions on its AC input, its transistor 24 will be turned on to complete the ciruit from point 22 to the common return 23.

During normal operating conditions of load 10, voltage V2 is low, but should components 12, 13 and 14 detectt a fault in opration, voltge V2 will rise significantly. Hence, under ormal conditions with V2 low transistors 25 and 26 are both turned off. When V2 exceeds V1 by more than the threshold base-to-emitter voltage of transistor 25 (i.e., by about 0.5 volt) transistor 25 turns on. When transistor 25 is turned on current is drawn from the base of transistor 26; this current now turns transistor 26 on. With transistor 26 now turned on, current I2 is conducted by transistor 26 to the controls of circuit breaker 11 via conductor 27. Current I2 omes from the positive bus 17 and passes through resistor 19. This additinal current through resistor 19 increases the voltage drop across the resistor and therefore decreases voltage V1 by the amount of the drop. since voltage V2 has not changed but voltage V1 has decreased, transistor 25 turns on harder. The net result is a feedback circuit which as soon as the threshold is reached turns hard on with no soft intermediate transition zone. To turn the transistors off again voltage V2 must fall below the turn on value by an amount equal to current I2 multiplied by the resistance of resistor 19. For example, this IR drop may be equal to $1.5K \times 1$ m.a. $= 1.5$ volts. The 1.5 volts are referred to as the hysteresis. Resistor 28 is provided for current limiting purposes.

Circuit 16 is the power supply for amplifiers 13 and the voltage level detector 15, the amplifiers requiring both positive and negative voltages. it includes a novel inhibit feature designed to eliminate nuisance tripping of circuit breaker 11 by the circuit 12 to 15 during power loss at the Ac input terminals 30 and 31 of power supply 16. The inhibit feature also prevents breaker tripping when the power to circuit 16 is turned off.

Instead of connecting point 22 directly to the common return 23 as it would be in an uninhibited power supply, it is now connected to the return via the collector-emitter of transistor 24. A rectifier 33, e.g., a diode, converts the alternating current supplied to terminals 30 and 31 into unidirectional pulses which are smoothed out into a relatively steady direct current by capacitor 32. Since the voltage on capacitor 32 normally exceeds the threshold voltage of zener diode 35, current i flows through the voltage dropping resistor 34, down through the zener diode, into the base of transistor 24 and out the emitter of the transistor to the common return. This flow of current i turns the transistor on to provide a current flow path from point 22 to common return 23. Transistor 24 remains turned on so long as the AC supply at terminals 30 and 31 is free from interruptions. Hence a circuit is maintained from point 22 to common return 23 for the voltage level detector to initiate tripping of breaker 11 should an abnormility appear in load 10. Resistor 36 insures that transistor 24 leaks an acceptable minimum amount of current relative to the value of the signal from point 22. Should the power at terminals 30 and 31 be interrupted, even momentarily, the voltage across capacitor 32 soon falls below the threshold voltage of zener diode 35, and as a result the zener diode cuts off and stops current i to the base of transistor 24. As a result, transistor 24 turns off and suppresses operation of the voltage level detector in that point 22 is in effect disconnected from the negative bus 23. Hence, dueing these abnormal conditions the detecting circuit 12 to 15 cannot cause the circuit reaker to disconnect the load from the line.

The power supply shown in FIG. 1 is a bipolar supply which provides relatively constant positive and negative voltages from buses 17 and 117 respectively to the common return 23. This type of supply is needed for the operational amplifiers at 13. The positive side of the power supply has a rectifier 33 for converting the alternating current into uiidirectional current, a capacitor 32 for smoothing out the rectified current, a resistor 34 and a zener diode 35 acting as a voltage regulator for maintaining a relatively constant voltage across bus 17 and common return 23, and a transistor 24 acting as a switching element in common return side of the level detector. When the zener diode conducts, transistor 24 is turned on so the level detector is energized from the buses. An interruption of the AC power causes the voltage acros the capacitor to fall and the zener diode to turn off, whereupon transistor 24 also turns off and breaks the negative side of the power supply to the level detector. with no power on the level detector, it cannot produce a signal that will trip the circuit breaker. The negative side of the power supply comprising components 133, 132, 134, 117 and 135 is the same as the positive side except that the inhibit feature 24, 36 is excluded.

Figure 2:
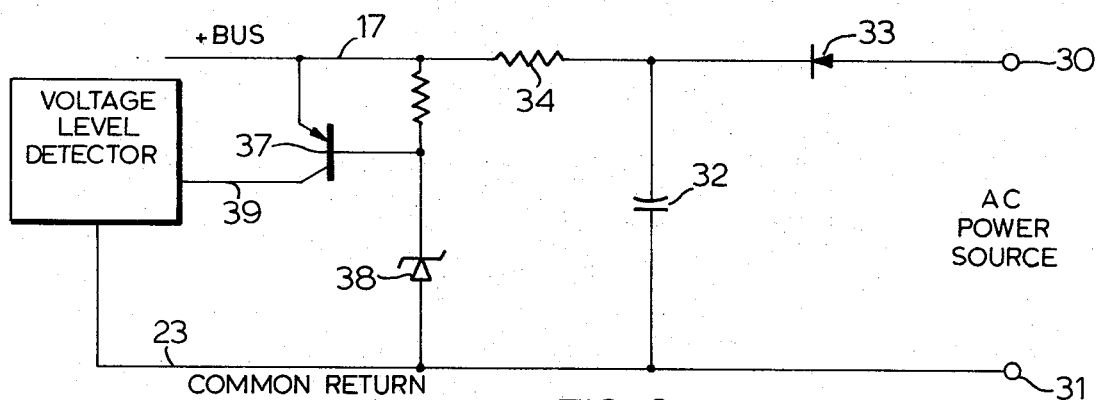

The circuit shown in FIG. 1 has the inhibiting elements in the common return side of the power supply. FIG. 2 is an equivalent circuit of a power supply having the inhibiting element in the positive side. Transistor 37 is placed in series with zener diode 38. Under normal conditions, with capacitor 32 sufficiently high in voltage, current is conducted from the emitter to the base of the transistor and then through the zener diode to the common return. A positive voltage, the sum of the base-emitter voltage and the zener voltage, is now available for the level detector. With the voltage on the capacitor at the powr level, the positive voltage is thus clamped at a fixed level. Under these circumstances a current flow path is established from the positive bus to the common return via the emitter-to-colletor of transistor 37, conductor 39, and the voltage level detector. The common return is connected directly to the level detector. Should the voltage on the capacitor fall below the threshold voltage of the zener, the zener will cease to conduct and this in turn will turn the transistor off. Hence an interruption of the Ac supply, even though momntarily, will cut off the supply of power to the level detectr and thereby suppress its operation in that it cannot now give tripping signals to the breaker.

Figure 3:
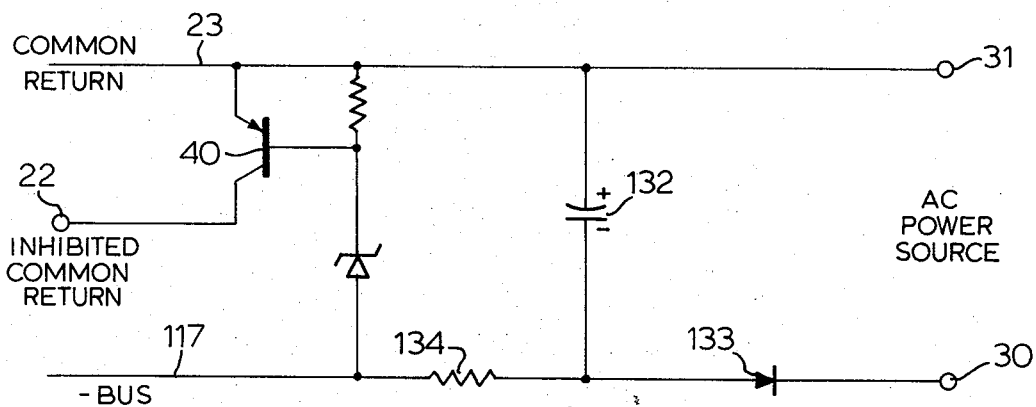
Figure 4:
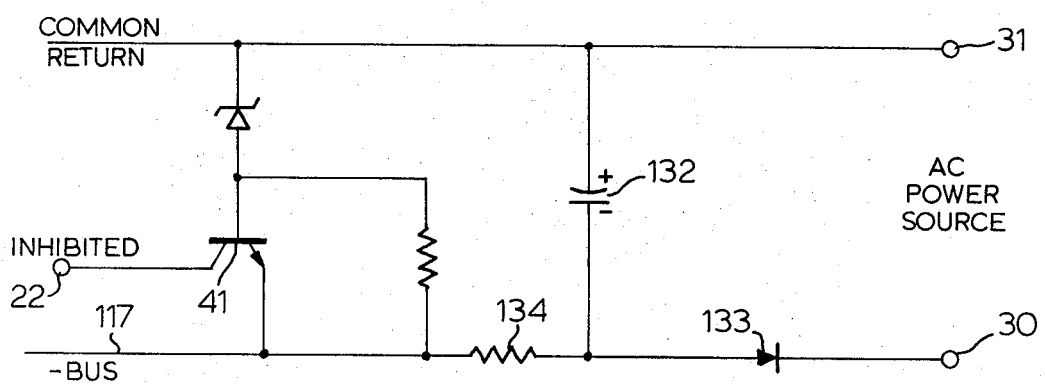

FIGS. 3 and 4 show the inhibiting components in the negative side of the power supply. In FIG. 3 point 22 is connected to the common return through transistor 40, and in FIG. 4 it is connected to the negative bus through transistor 41. Except for some minor rearrangement of the components for polarities, these two ciruits operate in the same way as the circuits shown in FIGS. 1 and 2.

The embodiments of the invention in which an exclusive property or privlege is claimed are defined as follows:

1. In a fault detection circuit used for rotecting electrical apparatus against overvoltges, the combination comprising:

a voltage level detector for comparing a reference voltage and a monitored voltage, said voltage level detector producing an overvoltage signal in response to a predetermined difference between said reference voltage and said monitored voltage;

a power supply for providing said reference voltage comprising Ac input terminals, a rectifier connected to said terminals for converting alternating current into unidirectional current, capacitance means connected to the output of said rectifier for smoothing out said unidirectional current and establishing a level of DC voltage, and a vooltage regulator connected to said capacitance means for producing sai reference voltage of lower value than said DC voltage level;

ormally "off" electroic switching means connected to be turned "on" by said reference voltge; and means coupling said switching means to said voltage level detector for inhibiting the production of said over-voltage signal when said reference voltage falls below a predetermined voltage level.

2. The invention defined in Claim 1, wherein said normally "off" electronic switching means comprises a transistor, the emitter-collector terminals of said transistor being coupled between said voltage level detector and a soure of energizing potential a zener diode breaking over at a lower voltage than said reference voltage; and means coupling said zener dioe between said reference voltage and the base terminal of said transistor, whereby said transistor is rendered nonconductive when said reference voltage falls below said predetermined voltage level.

3. The invention defined in claim 2, wherein said reference voltage is carried on a positive bus, said zener diode has its cathode connected to said bus, said transistor is a NPN transistor having its base connected to the anode of the zener diode and its eitter to a point of common potential, and said voltage level detector includes energizing terminals connected between said positive bus and the collector of said transistor respectively.

4. The invention defined in claim 2, wherein said reference voltage appears on a positive bus, said transistor is a PNP transistor having its emitter connected to said bus and its base to the cathode of said zener diode, said zener diode has its anode connected to a point of common potentil, and said voltage level detector includes energizing terminals connected between said point of common potential and the collector of said transistor respectively.

5. The invention defined in claim 2, wherein said reference voltage appears on a negative bus, said zener diode has its anode connected to said bus, said transistor is a PNP transistor having its base connected to the cathode of said zener diode and its emitter to a point of common potential, and said voltage level detector includes energizing terminals connected between said negative bus and the collector of said transistor respectively.

6. The invention defined in claim 2, wherein said reference voltage appears upon a negative bus, said transistor is a NPN transistor having its emitter connected to said bus and its base connected to the anode of said zener diode, said zener diode having its cathode connected to a point of common potential, and said voltage level detector includes energizing trminals connected between said point of common potential and the collector of said transistor respectively.

* * * * *